United States Patent

Wright et al.

[15] 3,673,054
[45] June 27, 1972

[54] LAMINATED STRUCTURES AND METHOD

[72] Inventors: Archibald N. Wright, Schenectady; Victor J. Mimeault, Elnora, both of N.Y.; Edward V. Wilkus, Monroe, Conn.

[73] Assignee: General Electric Company

[22] Filed: Jan. 19, 1970

[21] Appl. No.: 4,121

[52] U.S. Cl............................161/189, 117/93.31, 156/272, 156/283, 161/204, 161/208, 161/218, 204/159.17, 204/159.2, 204/163 R, 260/92.1
[51] Int. Cl...............B32b 31/28, B32b 27/16, B32b 15/08
[58] Field of Search..................156/272, 283, 333, 320–322; 161/189, 218, 204, 208; 204/159.17, 159.2, 163 R; 117/93.3, 93.31; 260/92.1

[56] References Cited

UNITED STATES PATENTS

| | | | |
|---|---|---|---|
| 2,773,781 | 12/1956 | Rodman | 117/138.8 UF |
| 2,718,452 | 9/1955 | Lontz | 264/205 |
| 3,228,864 | 1/1966 | Mastrangelo | 204/163 R |
| 3,228,865 | 1/1966 | Vogh | 204/163 R |
| 3,513,144 | 5/1970 | Kometani et al. | 260/92.1 |
| 3,522,076 | 7/1970 | Wright | 117/93.31 |
| 2,999,772 | 9/1961 | Burk et al. | 117/93.31 X |
| 3,389,012 | 6/1968 | Hamm | 117/93.31 X |
| 3,502,498 | 3/1970 | Petriello et al. | 161/189 X |
| 3,146,146 | 8/1964 | Anderson | 117/93.31 X |
| 2,833,686 | 5/1958 | Sandt | 161/189 X |
| 2,900,277 | 8/1959 | Schmitz et al. | 117/93.31 X |
| 2,932,591 | 4/1960 | Goodman | 117/93.31 X |
| 2,989,433 | 6/1961 | Yuan | 161/189 X |
| 3,036,930 | 5/1962 | Grimminger et al. | 117/93.31 |
| 3,119,707 | 1/1964 | Christy | 117/93.3 X |
| 3,132,046 | 5/1964 | Mann | 117/93.3 X |

*Primary Examiner*—Harold Ansher
*Attorney*—Charles T. Watts, Paul A. Frank, Jane M. Binkowski, Frank L. Neuhauser, Oscar B. Waddell and Joseph B. Forman

[57] ABSTRACT

Laminated structures are formed which are bonded by a novel fused tetrafluoroethylene polymer. The tetrafluoroethylene polymer is initially produced as a white powdery floc by irradiating tetrafluoroethylene monomer vapor at a temperature ranging from about 0° C to about 200° C and at a pressure of about 10 torr to 760 torr with light of wave length ranging from 1,800 to 2,400 Angstroms. The floc polymer is deposited on at least one surface of a lamina and a second lamina is placed over the deposited polymer to form a composite which is then heated to fuse the polymer and form the laminate.

13 Claims, No Drawings

LAMINATED STRUCTURES AND METHOD

This application relates to the art of fabricating laminated bodies. Specifically, it relates to a process for making laminated structures bonded by a novel fused tetrafluoroethylene polymer, and is also concerned with the unique articles resulting from this process.

Conventionally, laminated structures are comprised of laminae held together by a suitable binder which is usually a synthetic resin or polymer. The laminae may be selected from a variety of materials usually in sheet form such as paper, woven fabrics, fiber mats, metal and glass. Adhesion between laminae materials such as, for example, metals, and polymers used as binders continues to be a general problem in industrial applications. This problem is particularly severe with the almost nonwettable polymers such as polytetrafluoroethylene, PTFE, commonly called Teflon although chemical and temperature inertness makes this polymer attractive in other ways. A copolymer form of Teflon, known as the FEP form, has a chain similar to that of PTFE but carries some hexafluoropropylene monomer units as inserts. This FEP form has been used as a high temperature adhesive, but it cannot withstand the temperatures to which PTFE can be raised, and its dielectric properties are deficient.

It is an object of the present invention to provide laminated structures bonded by a novel fused tetrafluoroethylene polymer having improved resistance to delamination and good adhesive dielectric properties. This novel tetrafluoroethylene polymer is disclosed and claimed in copending U.S. patent application Ser. No. 3,724 (Docket RD–1006) entitled "Photopolymerization Of Tetrafluoroethylene And Polymer And Products Produced Therefrom," filed of even date herewith in the name of Archibald N. Wright, William R. Burgess and Edward V. Wilkus and assigned to the assignee hereof, which is, by reference, made part of the disclosure of the present application. Specifically, this U.S. patent application discloses a process for producing novel tetrafluoroethylene polymer which comprises providing tetrafluoroethylene vapor at a temperature ranging from about 0° C. to about 200° C at a pressure of about 10 torr to 760 torr and subjecting the vapor to ultraviolet light having a wave length in the range of about 1,800 to 2,400 Angstroms. The tetrafluoroethylene polymer formed is a white, flocculent, powdery "snow-like" type of material. Infrared analysis of this tetrafluoroethylene polymer shows significant absorption at the 980 cm$^{-1}$ line, which indicates the presence of $CF_3$ pendant groups. On the other hand, infrared analysis of conventional polytetrafluoroethylene shows no absorption at the 980 cm$^{-1}$ line. Differential scanning calorimetry data of the snow-like polymer shows evidence of first-order, crystal-crystal transition at about 20° C to 30° C as found in polytetrafluoroethylene. In addition, this tetrafluoroethylene polymer has an index of refraction of about 1.5. This tetrafluoroethylene floc polymer fuses in air at temperatures from about 100° C to about 350° C depending largely on the particular tetrafluoroethylene monomer pressure used in forming the polymer. Infrared analyses of the fused polymer and of conventional polytetrafluoroethylene yield the same structural analysis.

The copending application discloses that the novel tetrafluoroethylene polymer exhibits the same non-adhesive characteristics as conventional polytetrafluoroethylene. However, in contrast to common forms of polytetrafluoroethylene which are sinterable, this tetrafluoroethylene polymer is fusible. Fusion of the polymer herein means coalescence or a flowing together of the particles into a substantially integral form. On the other hand, sintering herein indicates a coherence of the particles essentially at their boundaries with little or no coalescence. The copending application discloses that since this tetrafluoroethylene polymer is fusible, films and coatings produced therefrom are less gas permeable and more stain-resistant than products fabricated by sintering conventional polytetrafluoroethylene. Fused coatings of the novel tetrafluoroethylene polymer are usually water-clear and any opacity present in the coating generally indicates incomplete fusion.

According to the present invention, this novel tetrafluoroethylene floc polymer is used to form laminated structures. Briefly stated, the process of the present invention comprised depositing the tetrafluoroethylene polymer on a surface of a lamina. A second lamina is placed over the deposited polymer to form a composite which is then heated to fuse the polymer and form the laminate. If desired, the composite can be heated and compressed to fuse the polymer and form the laminate.

As disclosed and claimed in the copending application, the process for forming the tetrafluoroethylene polymer comprises providing tetrafluoroethylene vapor at a pressure of about 10 torr to 760 torr at a temperature of about 0° C to 200° C and subjecting said vapor to ultraviolet light having a wave length of about 1,800 to 2,400 Angstroms. The process is carried out satisfactorily with the temperature of the tetrafluoroethylene vapor at room temperature, i.e., 25° C, or at a temperature close to room temperature, and these temperatures are preferred. However, the process is operable with the monomer temperature ranging from 0° to 200° C, but there is no advantage in intentionally using a temperature significantly higher or lower than room temperature.

The pressure of the tetrafluoroethylene monomer may vary widely depending largely upon the particular rate of polymerization desired as well as upon the particular type of floc polymer desired to be formed. The process is operable with the tetrafluoroethylene monomer vapor pressure varying from about 10 torr to about 760 torr. The lower the monomer vapor pressure, the slower is the rate at which the polymer forms. For example, if the process is used to deposit a layer of the polymer on a substrate surface, the lower the tetrafluoroethylene vapor pressure, the slower is the rate of deposition. Likewise, the rate of polymerization or polymer deposition increases with increasing pressure. Pressures higher than atmospheric pressure are not useful due to the danger of explosion. In addition, pressures higher than atmospheric would tend to produce high molecular weight polymers which are less thermoplastic, and at pressures significantly higher than atmospheric, the polymer formed would no longer be fusible.

With increasing tetrafluoroethylene monomer vapor pressure, a tetrafluoroethylene floc polymer of higher thermal stability is formed. Specifically, the polymer formed at higher tetrafluoroethylene monomer vapor pressures requires higher fusion temperatures than the polymer formed at lower monomer vapor pressures. In addition, during fusion, the polymer formed at lower pressures undergoes more weight loss, i.e., has a lower percent retention, than the polymer formed at higher pressures indicating that larger amounts of lower molecular weight polymer are formed at the lower tetrafluoroethylene vapor pressures.

In carrying out the polymer process, the tetrafluoroethylene monomer vapor is exposed to ultraviolet light having a wave length of 1,800 to 2,400 Angstroms to form the polymer. Since no sensitizers are used, wave lengths outside the 1,800 to 2,400 Angstrom range are not effective. Light having a wave length of 1,840 to 2,200 Angstroms produces a particularly satisfactory rate of polymerization, especially at room temperatures and atmospheric pressure. The rate of polymerization is also proportional to the intensity of the light as well as the pressure of the tetrafluoroethylene monomer, i.e., the more intense the light, the faster is the rate of polymerization. These factors can be readily controlled so as to obtain a satisfactory rate of polymerization.

Ultraviolet light from any source and of any type can be used. The light source need only furnish an effective amount of light of the required wave length, i.e., 1,800 to 2,400 Angstroms. Suitable light sources include carbon arcs, high pressure mercury vapor lamps, fluorescent lamps, argon glow lamps, photographic flood lamps and tungsten lamps.

The process for forming the novel tetrafluoroethylene polymer can be carried out in a number of different types of enclosures or reactors. The reactor, for example, can be a metal can. It need not be gas tight since polymer formation is not affected by the presence of other gases such as air, oxygen, moisture and nitrogen.

In one embodiment of the process for forming the novel tetrafluoroethylene polymer, gases or vapors, referred to herein as diluent gases, may be present in widely varying amounts, but generally not in an amount which would raise the total pressure of the reactor significantly higher than one atmosphere, without having any deteriorating effect on the process or the polymer formed. The diluent gases are generally used to maintain the reaction atmosphere at atmospheric pressure. The maintenance of atmospheric pressure is of particular use for reactors for manufacturing purposes, which may collapse if the reaction is carried out at subatmospheric pressure. It is understood that up to about one atmosphere total pressure within the reactor, it is the pressure of the tetrafluoroethylene monomer gas that determines the molecular weight of the tetrafluoroethylene polymer formed. Specifically, it is the tetrafluoroethylene gas monomer pressure which substantially controls the rate of deposition of the floc polymer, its molecular weight average, its molecular weight distribution, and its molecular structure. Thus, this process produces a "tailored" fluorocarbon polymer.

Specifically, to some extent the thermoplasticity of the polymer is controlled by controlling the extent of its pendant $CF_3$ groups. The degree to which these $CF_3$ groups are present is indicated by the intensity of the absorption line at 980 $cm^{-1}$, the greater the intensity of this absorption line, the larger is the number of $CF_3$ groups present. It was found that the longer the residence time of the monomer charge, and hence build-up of byproduct vapors, the greater is the amount of the $CF_3$ pendant groups in the resulting tetrafluoroethylene polymer. These $CF_3$ pendant groups usually disappear when fusion of the polymer is complete so that the result is a fused tetrafluoroethylene polymer having the same infrared spectra as conventional tetrafluoroethylene. However, in some cases, if desired, additional heating of the fused polymer film at a temperature higher than 350° C may be necessary to completely remove all of the $CF_3$ groups.

The laminae used in forming the laminates of the present invention can vary widely in structure. They can be solid or porous, organic or inorganic, metallic or non-metallic. Representative of the metallic laminae useful in the present invention are lead, copper, gold, silver, tin, iron, brass, and aluminum. Examples of nonmetallic laminae are glass, mica, carbon, as well as woven fabrics or mats formed from fibers such as, for example, glass and asbestos fibers.

The tetrafluoroethylene floc polymer can be deposited on a surface of a lamina by a number of methods. Preferably, the lamina or laminae are placed in the reaction chamber and, as the tetrafluoroethylene polymer forms, it deposits at random throughout the reactor and thereby directly on the laminae. Generally, better results are obtained by maintaining the lamina within the reactor at about room temperatures to produce a more uniform deposit of floc polymer when higher monomer pressures are used. Usually, such cooling of the lamina is desirable at tetrafluoroethylene monomer gas pressures in excess of 300 torr. Alternatively, the tetrafluoroethylene polymer can be manually or mechanically deposited on the bonding surface of the lamina outside the reactor. The polymer may also be deposited by coating the lamina bonding surface with an emulsion or suspension of the polymer.

In forming the laminated structure of the present invention, the tetrafluoroethylene polymer is deposited on a surface of at least one of the laminae preferably to form a continuous deposit thereon. The laminated structures can be formed in a conventional manner and can vary widely in structure and form. For example, the tetrafluoroethylene floc polymer can be deposited on a surface of a lamina, and a second lamina placed over the deposited polymer to form a composite or sandwich. The composite is then heated or heated and compressed in a conventional manner to fuse the polymer and form the laminate. Alternatively, the polymer can be deposited on the bonding surface of a lamina and partially fused. A second lamina is then placed over the partially fused polymer to form a sandwich which is then heated or heat-compressed to substantially complete polymer fusion and form the laminated structure. In another example, the tetrafluoroethylene floc polymer can be deposited on the bonding surfaces of two laminae which can then be formed into a sandwich with the deposited polymer layers intermediate the laminae, and the sandwich subjected to heat or heat and pressure to fuse the polymer layers and form the laminate. As still another example, the tetrafluoroethylene polymer can be deposited on the bonding surfaces of a number of laminae which can then be stacked up, one upon the other, with a polymer layer separating each lamina and heated or heat-compressed to form a laminated structure.

The temperatures and pressures used to form the laminated structures of the present invention can vary widely and are determinable empirically. Preferably, the laminating temperature should be such as to substantially complete the fusion of the bonding tetrafluoroethylene polymer. Generally, it will range from about 100 to about 350° C. When a laminating pressure is used, it can vary depending somewhat on the specific laminae used and the particular laminated structure to be formed. Preferably, a pressure is used which produces intimate contact of the laminae bonding surfaces with the polymer during fusion. When heating of the polymer to effect fusion is completed, the laminated structure should preferably be allowed to cool to room temperature under pressure when pressure is used.

The thickness of the fused bonding polymer of the present laminated structure may vary widely depending generally on the particular laminated structure to be formed and the nature of the substrate and is determinable empirically.

All parts and percentages used herein are by weight unless otherwise indicated.

The invention is further illustrated by the following examples.

In all of the following examples the procedure was as follows unless otherwise noted:

Ultraviolet light was provided by a 700 watt Hanovia lamp, Model No. 674A which emitted light of wave length ranging from about 1,849 A to about 13,673 A. Specifically, it emitted ~ 17 watts of light of wave length of about 1,849 to 2,400 A and ~ 131 watts of wave length of 2,400 A to 3,360 A in the ultraviolet. The lamp was provided with a reflector. This lamp was capable of heating the reactor system to about 200° C.

In all of the runs the temperature of the tetrafluoroethylene monomer vapor was below room temperature when introduced into the reactor, but shortly after introduction into the reactor, usually less than within about 1 minute, the vapor equilibrated to room temperature, and during the run its temperature raised by the ultraviolet light to above room temperature. Dry $N_2$ gas, when used, was at room temperature when introduced into the reactor.

The reactor used was essentially a rectangular vacuum reaction chamber, approximately 13 cm. wide, 29 cm. long and 7 cm. high. In the chamber top was an 8 × 20 cm. quartz window which was situated directly above, and 3 cm. from, an 8 × 20 cm. copper cooling block inside the chamber. The block was cooled by the internal flow of fluid, cooled and driven outside the chamber. Those laminae placed in the reactor were placed on the cooling block. Ultraviolet input was provided by the Hanovia lamp which was aligned over, and 5 cm. away from, the window. The quartz window used was transparent to light of wave length greater than about 1,800 A. Tetrafluoroethylene monomer pressure inside the chamber was obtained and maintained through a valved connection to a temperature-regulated source of tetrafluoroethylene monomer. The tetrafluoroethylene monomer gas used in all of the examples was free of inhibitor. Specifically, if the monomer source were at room temperature in the shipping cylinder, the gas was passed through a dry ice trap to remove inhibitor. Otherwise, a liquid source of tetrafluoroethylene, pre-purified from inhibitor by distillation, was used as a direct source of monomer vapor at low temperatures. Thermocouples inside the chamber enabled the recording of the temperature of the block as well as specimens thereon.

Heating to fuse the polymer was carried out in a forced air oven.

A standard bridge technique was used to determine capacitance.

All glass slides and evaporated aluminum coated glass slides used as laminae were standard microscope slides, i.e., 1 inch wide, 3 inches long and about one thirty-seconds inch thick. All aluminum coupons used as laminae were 1 inch wide, 3 inches long and about one-eighth inch thick.

EXAMPLE 1

In this example, the laminae were glass slides. The slides were placed in the reactor, and with the tetrafluoroethylene monomer pressure at 300 torr and nitrogen gas pressure at about 400 torr, the tetrafluoroethylene floc polymer was deposited on the surfaces of the slides for 60 minutes. During the deposition the slides were cooled and maintained at a temperature of 5° C. The floc polymer deposited on the slides in a substantially uniform manner and formed a continuous coating thereon.

The floc coated slides were then placed together with the polymer intermediate the slides to form a lap joint with one square inch of overlap. Under a load of about 7 oz/in$^2$, the lap assembly was heated at a temperature of 330° C for 100 minutes and then allowed to cool to room temperature under the load.

The resulting laminated structure could not be pulled apart manually and Instron measurements indicated a shear strength greater than 50 lbs/in$^2$.

EXAMPLE 2

In this example, the laminae were aluminum frying pan coupons which were pre-cleaned with a trichloroethylene dip.

The coupons were placed in the reactor, and with the tetrafluoroethylene monomer pressure at 300 torr and nitrogen gas pressure at about 400 torr, the tetrafluoroethylene floc polymer was deposited on the laminae surfaces for 50 minutes. During the deposition the coupons were cooled and maintained at a temperature of 25° C. The floc polymer deposited on the surfaces of the coupons in a substantially uniform manner and formed a continuous coating thereon.

The floc coated coupons were placed in a furnace and heated separately for 45 minutes at a temperature of 350° C to give continuous clear films, each having a thickness of about 54,000 A. The fused polymer coated coupons were then placed back in the reactor with the fused coatings exposed to the reactor atmosphere and were maintained at 25° C during floc deposition. With the tetrafluoroethylene monomer pressure at about 500 torr and no other gas present, tetrafluoroethylene floc polymer was deposited on the fused coatings for 50 minutes. The floc polymer deposited on the fused coatings in a substantially uniform manner forming a continuous deposit thereon.

The floc coated coupons were then placed together with the polymer intermediate the coupons to form a lap joint which was two inches square. Under a load of 7 oz/in$^2$ the lap assembly was heated at a temperature of 350° C for 45 minutes and then allowed to cool to room temperature under the load.

The resulting laminated structure was held together by an insulating dielectric layer as determined by the standard bridge technique. The laminated structure was tested on an Instron tester and showed a shear strength of 2 lbs/in$^2$.

EXAMPLE 3

In this example a laminated structure was formed comprised of a silicon wafer bonded to a glass slide.

The glass slide was placed in the reactor where it was maintained at a temperature below 50° C during floc deposition. With the tetrafluoroethylene monomer gas pressure at 400 torr and with no other gas present in the reactor, floc polymer was deposited on the glass for 55 minutes in a substantially uniform manner and formed a continuous deposit thereon. A silicon wafer about the size of a 50 cent piece, but thinner, was placed on the deposited floc polymer and the assembly was heated at a temperature of 350° C for 45 minutes under no compressive load. When the laminated structure had cooled to room temperature, it showed sufficient adhesion to support the weight of the glass slide.

EXAMPLE 4

Aluminum coupons pre-cleaned with a trichloroethylene dip were used as laminae. The coupons were placed in the reactor where they were maintained at a temperature below 50° C during floc deposition. With the tetrafluoroethylene monomer pressure at 400 torr and no other gas present, the tetrafluoroethylene floc polymer was deposited on the coupons for 55 minutes. The floc polymer deposited on the coupons in a substantially uniform manner and formed a continuous coating thereon. The floc-coated coupons were separately heated at a temperature of 350° C for 45 minutes to fuse the polymer.

The coupons were then placed back in the reactor with the fused coatings exposed to the reactor atmosphere, and another layer of floc polymer was deposited on the fused films under the same conditions as the initial floc polymer. The coupons were then heated at a temperature of 350° C for about 25 minutes. A sandwich was then formed of the coupons with the polymer intermediate the coupons. Under a load of 10 oz/in$^2$ the sandwich was heated at 350° C for 40 minutes and allowed to cool to room temperature under load. The resulting laminated structure had fair adhesion, since it supported the weight of the coupons.

EXAMPLE 5

In this example aluminum foils, each 1 inch by 3 inches, were used as laminae and were pre-cleaned with acetone. Two of the foils were placed in the reactor where they were maintained at a temperature of 10° C during floc deposition. With the tetrafluoroethylene monomer vapor pressure at 45 torr, tetrafluoroethylene floc polymer was deposited on the foils for 90 minutes. The floc deposited on the surfaces of the foils to form substantially uniform continuous deposits thereon. The floc-coated foils were placed together with the polymer intermediate the foils to form a sandwich which was heated at 240° C for 40 minutes under a compressive load of 7 oz/in$^2$ and then allowed to cool to room temperature under load. The resulting laminated structure showed good adhesion and required some force to be pulled apart manually.

The pulled apart aluminum foil laminae were then placed together again in the same manner with the polymer intermediate the foils, and the sandwich heated again under a load of 7 oz/in$^2$ at 275° C for 45 minutes and then allowed to cool to room temperature under the load. The resulting laminated structure again showed good adhesion and this time required a somewhat greater force to be separated a second time manually.

The laminae were then put together again in the same manner and the sandwich again heated at a temperature of 300° C for 40 minutes under the same load and allowed to cool to room temperature under load. The resulting laminated structure again displayed good adhesion and this time required a significantly greater force to be pulled apart manually.

For comparison purposes, Teflon No. 6, which is a large particle size polytetrafluoroethylene, was put on a surface of a foil to form a substantially uniform continuous layer thereon. A second foil was placed over the deposited Teflon to form a sandwich. Under a compressive load of 7 oz/in², the sandwich was heated in a forced air oven at a temperature of 360° C for 60 minutes and then allowed to cool to room temperature under load. Examination of the sandwich showed that no fusion of the Teflon polymer occurred and hence there was no adhesion.

EXAMPLE 6

Clear glass slides were used as laminae. Tetrafluoroethylene floc polymer which had been prepared at a monomer pressure of 25–40 torr was manually deposited on a surface of one glass slide to form a substantially continuous deposit thereon. The second glass slide was then placed over the deposited polymer to form a sandwich which was heated under a load of 7 oz/in² at a temperature of 350° C for 45 minutes and then allowed to cool to room temperature under load.

The resulting laminated structure supported its own weight and some force had to be applied to pull the structure apart manually.

EXAMPLE 7

In this example the laminae were glass slides coated with evaporated aluminum. Two of the slides were placed in the reactor where they were maintained at a temperature below 50° C during floc deposition. Under a tetrafluoroethylene monomer pressure of 40–60 torr, tetrafluoroethylene floc polymer was deposited on the slides for 125 minutes. The floc deposited on the slides substantially uniformly and formed a continuous deposit thereon.

A sandwich was formed of the glass slides with the polymer intermediate the glass. Under a load of 7 oz/in² the sandwich was heated at 300° C for 45 minutes and allowed to cool to room temperature under load. The resulting laminated structure showed very good adhesion and required significant force to be separated manually.

EXAMPLE 8

In this example the laminae were glass slides coated with evaporated aluminum. One of the slides was placed in the reactor where it was maintained at a temperature below 50° C during floc deposition. Under a tetrafluoroethylene monomer pressure of 300 torr and nitrogen gas pressure of 440 torr, tetrafluoroethylene floc polymer was deposited on the slide for 70 minutes. The floc deposited on the slide substantially uniformly forming a continuous deposit thereon.

A second glass slide was then placed over the deposited floc polymer to form a sandwich which was heated under a load of 7 oz/in² at a temperature of 300° C for 35 minutes, then at a temperature of 360° C for 25 minutes, and then allowed to cool to room temperature under the load. The resulting laminate was a dielectric structure having a capacitance of 400 pf/in². On separating the laminated structure manually, some of the aluminum coating was removed from one of the slides illustrating the good adhesiveness of the fused polymer.

EXAMPLE 9

Clear glass slides were used as laminae in this example. Two of the glass slides were placed in the reactor where they were maintained at a temperature below 50° C during floc polymer deposition. Under a tetrafluoroethylene monomer pressure of 300 torr and a nitrogen gas pressure of 440 torr, floc was deposited on the slides for 60 minutes. The tetrafluoroethylene floc polymer deposited substantially uniformly forming a continuous deposit on the slides.

The slides were then formed into a sandwich with the polymer intermediate the glass, and the sandwich was heated under a load of 7 oz/in² for 35 minutes at 290° C. Since the resulting fused polymer film was still opaque, the sandwich was again heated under the same conditions for an additional 25 minutes. Examination of the sandwich still showed some opaqueness indicating incomplete fusion so the sandwich was again heated under the same conditions for an additional 45 minutes and allowed to cool to room temperature under load. The resulting laminated structure was clear showing that substantially complete fusion had occurred. The laminated structure could not be separated manually.

EXAMPLE 10

In this example, the laminae were glass slides coated with evaporated aluminum. The slides were placed in the reactor where they were maintained at a temperature below 50° C during floc deposition. Under a tetrafluoroethylene monomer pressure of 300 torr and a nitrogen gas pressure of 440 torr, floc polymer was deposited on the slides for 50 minutes.

A sandwich was formed of the slides with the polymer intermediate the glass. The sandwich was heated at 320° C for 45 minutes under a compressive load of 7 oz/in² and then allowed to cool to room temperature under the load.

The resulting laminated structure was held together by an insulating layer as determined by standard bridge techniques and required some force to be separated manually.

EXAMPLE 11

In this example the laminae were glass slides coated with evaporated aluminum. Four of the slides were placed in the reactor where they were maintained at a temperature of 20° C during floc deposition. Under a tetrafluoroethylene monomer pressure of 300 torr and nitrogen gas pressure of 440 torr, floc polymer was deposited on the slides for 50 minutes. The floc deposited on the slides substantially uniformly forming continuous deposits thereon.

Two of the floc coated slides were placed together with the polymer intermediate the slides, and the resulting sandwich was heated at 340° C for 40 minutes under a load of 7 oz/in² and then allowed to cool to room temperature under the load. The resulting laminated structure had a capacitance of 238 picofarads.

The two remaining floc coated slides were also formed into a sandwich in the same manner and were heated under a load of 7 oz/in² at a temperature of 220° C for 30 minutes, then at 300° C for 30 minutes and then allowed to cool to room temperature under the load. The resulting laminated structure was insulating showing a capacitance of 455 picofarads.

It appears that the heating of one of the sandwiches initially at a lower temperature caused loss of the lower molecular weight polymer component so that later heating at a higher temperature produced a laminated structure with improved insulating properties. Both laminates showed good adhesion.

What is claimed:

1. A laminated structure comprised of at least two laminae bonded together by a fused homopolymer of tetrafluoroethylene, said fused homopolymer being fused from a white, flocculent snow-like type particulate homopolymer of tetrafluoroethylene which shows significant infrared absorption at the 980 cm$^{-1}$ line and has an index of refraction of about 1.5, and which fuses at a temperature in the range of about 100° C to 350° C into a substantially integral fused form.

2. A laminated structure according to claim 1 wherein said laminae are aluminum.

3. A laminated structure according to claim 1 wherein said laminae are glass.

4. A laminated structure according to claim 1 wherein said laminae are glass and silicon.

5. A process for preparing a laminated structure comprised of at least two laminae bonded together by a fused polymer of tetrafluoroethylene which comprises depositing a white, flocculent snow-like type particulate polymer of tetrafluoroethylene on at least one surface of a lamina, placing a second lamina over the deposited polymer to form a composite, and heating said composite to fuse the polymer and form a laminated structure, said white, flocculent snow-like type particulate polymer of tetrafluoroethylene being fusible at a temperature ranging from about 100° C to 350° C and being formed by irradiating tetrafluoroethylene monomer vapor at a temperature ranging from about 0° C to about 200° C and at a pressure of about 10 torr to 760 torr with ultraviolet light of wave length ranging from 1,800 to 2,400 A.

6. A process according to claim 5 wherein said composite is heated and compressed to fuse the polymer and form the laminated structure.

7. A process according to claim 5 wherein said laminae are aluminum.

8. A process according to claim 5 wherein said laminae are glass.

9. A process according to claim 5 wherein one lamina is glass and another lamina is silicon.

10. A process for preparing a laminated structure comprised of at least two laminae bonded together by a fused polymer of tetrafluoroethylene which comprises depositing a white, flocculent snow-like type particulate polymer of tetrafluoroethylene on at least one surface of each of said two laminae, forming a composite of the laminae with the polymer intermediate the laminae, and heating said composite to fuse the polymer and form a laminated structure, said white, flocculent snow-like type particulate polymer of tetrafluoroethylene being fusible at a temperature ranging from about 100° C to 350° C and being formed by irradiating tetrafluoroethylene monomer vapor at a temperature ranging from about 0° C to 200° C and at a pressure of about 10 torr to 760 torr with ultraviolet light of wave length ranging from 1,800 to 2,400 Angstroms.

11. A process according to claim 10 wherein said composite is heated and compressed to fuse the polymer and form the laminated structure.

12. A process according to claim 10 wherein the laminae are glass.

13. A process according to claim 10 wherein the laminae are aluminum.

* * * * *